United States Patent Office 3,480,592
Patented Nov. 25, 1969

3,480,592
ELASTOMERIC POLYURETHANES
Dieter Dieterich and Erwin Müller, Leverkusen, and Otto Bayer, Leverkusen-Bayerwerk, Germany, assignors to Farbenfabriken Bayer Aktiengesellschaft, Leverkusen, Germany, a German corporation
No Drawing. Filed Dec. 3, 1963, Ser. No. 327,793
Claims priority, application Germany, Dec. 5, 1962, F 38,472; Feb. 28, 1963, F 39,135
Int. Cl. C08g 22/04
U.S. Cl. 260—77.5
14 Claims

ABSTRACT OF THE DISCLOSURE

Elastic polyurethanes prepared by reacting a predominantly linear polyurethane containing tertiary nitrogen atoms with an acid having a $P_k$ value of a maximum of 6 in a solvent to convert it into the corresponding salt and then removing the solvent to yield an elastic, non-tacky, water insoluble polyurethane having the properties of a cross-linked polyurethane elastomer.

This invention relates to polyurethane plastics and more particularly to a method of producing cross-linked elastomeric polyurethane plastics.

Heretofore it has been known to treat compounds of high molecular weight, more especially polyurethanes, which contain basic nitrogen atoms with polyfunctional peralkylation agents, and thus convert them into polyquaternization polymers with simultaneous cross-liking. An increase in solubility in hydrophilic media is achieved by the concurrent use of monofunctional quaternizing agents.

The increase in the hydrophilic nature of a substance of high or low molecular weight by monofunctional quaternization is generally known and is widely used. However, since a cross-linking or lengthening of the chain is not effected just by quaternization with monofunctional alkylation agents, the concurrent use of polyfunctional alkylation agents or other types of cross-linking agents, for example, those based on urea formaldehyde, has hitherto been advised for the production of cross-linked and thereby water-insoluble, elastic, non-tacky materials. In order to exclude premature crosslinking, this generally requires the use of binary systems and/or an after-treatment, for example, by the action of an increased temperature, to cause cross-linking.

It is, therefore, an object of this invention to provide a method for producing cross-linked elastomeric polyurethanes which is devoid of the foregoing disadvantages. Another object of this invention is to provide a cross-linked elastic, nontacky and water-insoluble polyurethane elastomer. A still further object is to provide improved polyurethane plastics prepared from solutions based on polyhydroxyl compounds, polyisocyanates, and if desired, chain extenders containing reactive hydrogen containing groups in which at least one of the said components contains at least one tertiary nitrogen group.

The foregoing objects and others which will become apparent from the following description are accomplished in accordance with the present invention, generally speaking, by providing an elastic synthetic polyurethane plastic by reacting a predominantly linear polyurethane containing tertiary nitrogen atoms with an acid having a $P_k$ value of a maximum of 6, but preferably of a maximum of 4 and preferably in a polar hydrophilic solvent, to convert it into the corresponding salt, and then removing the solvent under conditions whereby the polyurethane becomes a cross-linked, elastic, non-tacky and water insoluble material. The polyurethane containing at least one tertiary nitrogen atom is prepared by reacting an organic polyhydroxyl compound, a polyisocyanate, and in some instances, a chain extender containing active hydrogen containing groups wherein at least one of these reactants contains at least one tertiary nitrogen atom. In the event an acid having a $P_k$ value of from 4 to 6 is used, an after-treatment with the herein below designated acids is required. It is preferable, therefore, to use those acids in which the $P_k$ value is a maximum of 4.

Due to the formation of these salts with the acids prescribed herein by the reaction according to this invention, materials are obtained in which salt-like and organophilic segments having a chain length of at least 50 atoms, alternate with one another. The salt groups within the molecular chains arrange themselves in a pseudo-crystalline manner, with the urethane groups assuming more or less vicinal positions. This molecular disposition gives rise to the formation of hydrogen bridges between the urethane groups thus resulting in a cross-linked product. However, there is no true cross-linking as such with chemical bonds, but in actuality, the product is a salt with additional hydrogen bridges.

Generally, the final reaction product is not dispersible in water. However, if the reaction product had a great number of salt-like groups and was soluble before the formation of the cross-links, then the product can be resoluble in water even in its final state.

Therefore, a rubber-like reaction product is produced from a polyhydroxyl compound and an organic polyisocyanate with the concurrent use of a chain extender if so desired, when at least one of these components contains at least one tertiary amine. The generally rubber-like reaction products are either already prepared in solution or are dissolved after they have been produced and converted in solution into the corresponding salts, so that an elastic, crosslinked plastic is formed after suitable removal of the solvent. The material has the physical properties of a true elastomer with respect to tensile strength elongation at break, elasticity and so on.

In the practice of this invention, the polyhydroxyl compounds are preferably predominantly linear and preferably of a molecular weight of about 400 to about 10,000 and most advantageously 1,000 to 3,000. Included are, for example, polyethers, polyesters, polyacetals, polyester amides and polythioethers. Examples of polyethers are the polymerization products of tetrahydrofuran, propylene oxide, ethylene oxide, butylene oxide, and the like, as well as copolymerization or graft polymerization products of these compounds. It is also possible to start from homogeneous or mixed polyethers, which are obtained, for example, by condensation of hexanediol, methyl hexanediol, heptanediol or octanediol, if desired, with addition of 10 to 30% of lower glycols. Ethoxylated or propoxylated (or mixed alkoxylated) glycols such as ethylene glycol, propylene glycol, butanediol, xylylene glycol, hexanediol and the like may also be used. If the polyether is to contain the tertiary nitrogen group, then alkoxylated and in particular ethoxylated and propoxylated glycols with tertiary amino groups, such as propoxylated diethanolamine or alkoxylated primary amines, for example, alkoxylated aniline, toluidine and hydrazine may, for example, be used. Any of the alkylene oxides mentioned above may be used. In this case, each polyether molecule contains a tertiary nitrogen atom. Another class of suitable polyethers are the addition products of ethylene oxide and propylene oxide to N-methyl N,N-bis-(α-methylaminopropyl)-amine. Any suitable polyhydric polythioether may be used such as the condensation products of a polyhydric thioether with itself or with other glycols including those mentioned above or with any of the alkylene oxides mentioned above. Any suitable polyhydric thioether may be used, such as, for example, thiodiglycol, 3,3'-dihydroxy propyl sulfide, 4,4'-dihydroxy butyl sulfide, 1,4-(β-hydroxy ethyl)-phenylene dithioether and the like. The thioether may also contain tertiary amino groups by including in the preparation thereof, glycols containing tertiary amines such as dioxyethylaniline in addition to those mentioned above.

Any suitable polyacetal may be used such as the reaction products of aldehydes and polyhydric alcohols and including in particular the water-insoluble types of hexanediol and formaldehyde or hexanediol and divinyl ether, and also of 4,4'-dioxyethoxy-diphenyl-dimethyl-methane and formaldehyde. Other suitable alcohols include ethylene glycol, propylene glycol, butanediol, pentanediol, dioxyethyl aniline, propoxylated diethanolamine and the like. Additional aldehydes include butyraldehyde, benzaldehyde and the like. Polyacetals containing tertiary nitrogen atoms can be obtained by replacing at least a part of the glycols to be reacted with formaldehyde by one of the above-mentioned glycols containing tertiary nitrogen atoms.

Polyesters and polyesteramides which are obtained in known manner from polyhydric alcohols such as ethylene glycol and polycarboxylic acids, such as adipic acid and the like, if desired, with the concurrent use of diamines such as ethylene diamine and amino alcohols such as ethanolamine may also be used. For example, polyesters with tertiary amino groups are obtained by incorporating methyl diethanolamine by condensation.

It is also possible to start from those polyhydroxyl compounds which already contain urethane or urea groups. The polyhydroxyl compounds can be readily mixed with one another even those without or with tertiary nitrogen groups.

Any suitable diisocyanate may be used in reaction with the polyhydroxyl compound to produce polyurethane polymers such as, for example, tetramethylene diisocyanate, hexamethylene diisocyanate, dicyclohexylmethane diisocyanate, cyclohexane diisocyanate, 1,5-napthalene diisocyanate, 4,4'-diphenylmethane diisocyanate, 4,4'-dibenzyl diisocyanate, 1,3-phenylene diisocyanate, 1,4-phenylene diisocyanate, 2,4-toluylene diisocyanate, 2,6-toluylene diisocyanate and isomeric mixtures thereof, tetramethyl diphenylmethane diisocyanate and the like. The quaternizable group, i.e., a tertiary amino group may be contained in the polyisocyanate. Any suitable compound of this type such as, for example, the reaction products of 2 mols of any of the aforementioned diisocyanates with methyl diethanolamine, butyl diethanolamine, N,N-dioxyethyl aniline, N,N'-dioxyethyl toluidine and the like may be used. The less reactive diisocyanates such as tetra alkyl diphenylmethane diisocyanate, dicyclohexylmethane diisocyanate and aliphatic diisocyanates offer the advantage of yielding reaction products with a predominantly linear structure.

The basic tertiary amine nitrogen can also be contained in the polyisocyanates. Polyisocyanates of this type, which can be mixed with the simple diisocyanates are, for example, obtained by reacting 2 mols of one of the aforementioned diisocyanates with methyl diethanolamine, butyl diethanolamine, N,N-dihydroxyethyl aniline and N,N-dihydroxyethyl toluidine.

Any suitable chain extending agent containing active hydrogen atoms, which are reactive with —NCO groups and having a molecular weight less than about 350 can be used in the preparation of the polyurethane polymers such as, for example, polyhydric alcohols, diamines, amino alcohols and the like. Any suitable polyhydric alcohol may be used such as, for example, ethylene glycol, propylene glycol, butylene glycol, xylylene glycol, phenylene di(β-hydroxyethylether), trimethylolpropane, glycerine, pentaerythritol and the like. Any suitable diamine may be used such as, for example, ethylenediamine, butylenediamine, phenylenediamine, toluylenediamine, 4,4'-diamino diphenylmethane, 3,3'-dichloro-4,4'-diamino diphenylmethane, hydrazine and the like. Any suitable amino alcohol may be used such as, for example, aminoethyl alcohol, aminopropyl alcohol, aminobutyl alcohol and the like. The tertiary nitrogen group can be present in the chain extender. Any suitable chain extending agent containing a tertiary nitrogen group may be used such as, for example, the addition product of 2 mols of ethylene oxide or propylene oxide and monoalkyl amines such as, for example, methyl diethanolamine, butyl diethanolamine, oleyl diethanolamine, N,N-dioxyethyl aniline, N,N-dioxyethyltoluidine, alkyl diisopropanolamine and aryl diisopropanolamine and the like. The alkyl and aryl groups of these compounds can be methyl, ethyl, propyl, butyl, phenyl, naphthyl, tolyl and the like.

Any compound which behaves as an acid and has a $P_k$ value of a maximum of 4 may be used for forming the salt. Most mineral acids and many organic acids, especially carboxylic and sulfonic acids and their salts, are suitable in the practice of this invention. Acids containing complex anions and acid phenols as well as CH acids and acid-nitro compounds are also suitable.

Some specific compounds which are suitable for the formation of the salt are, for example, hydrofluoric acid, hydrochloric acid, hydrobromic acid, chloric acid, perchloric acid, sulphurous acid, sulphuric acid, thiosulphuric acid, selenous acid, nitric acid, hypophosphorous acid, phosphorous acid, phosphoric acid, arsenic acid, cyanic acid, fluoroboric acid, fluorosilicic acid, hexachloroantimony acid, hexachlorostannic acid, chromic acid, fluorosulphonic acid, peroxy disulphuric acid, amidosulphonic acid, hydroxylamine monosulphonic acid, hydrazine disulphonic acid, sodium hydrogen sulphate, potassium hydrogen fluoride, sodium dihydrogen phosphate, sodium dihydrogen fluorosilicate, aluminium hydrogen sulphate.

Formic acid, chloroacetic acid, dichloroacetic acid, trichloroacetic acid, chlorobromoacetic acid, bromoacetic acid, tribromoacetic acid, trifluoroacetic acid, sulphoacetic acid, cyanacetic acid, methoxyacetic acid, ethoxyacetic acid, sulphodiacetic acid, trisulphidoacetic acid, α,α'-dimethyl thinonyl diacetic acid, nitrilo triacetic acid, ethylene diamine tetra acetic acid, glycolic acid, diglycolic acid, thioglycolic acid, thiodiglycolic acid, methylene-bis-thioglycolic acid, methyl sulphonyl acetic acid, ethyl sulphonyl propionic acid, β-chloropropionic acid, methane sulphonic acid, ethane sulphonic acid, formamidine sulphinic acid, 2-chloroethane sulphonic acid, 2-hydroxyethane sulphonic acid, acetone monosulphonic acid, lactic acid, trichlorolactic acid, malonic acid, oxalic acid, succinic acid, malic acid, maleic acid, fumaric acid, chloromaleic acid, bromofumaric acid, dimethyl fumaric acid, dihydroxymaleic acid, dihydroxyfumaric acid, dibromosuccinic acid, aconitic acid, mesaconic acid, citraonic acid, itaconic acid, tartaric acid, dihydroxy tartaric acid mucic acid, saccharic acid, oxaluric acid, tetrolic acid, pyroracemic acid, acetyl pyroracemic acid, acetylene dicarboxylic acid, azidodithiocarboxylic acid, glyoxime dicarboxylic acid, glycerine boric acid, pentaerythritol boric acid, mannitol boric acid, nitro malonic ester, isonitrosoacetic acid ester, methyl nitrolic acid, cyanoform, 2-phenol sulphonic acid, 3-phenol sulphonic acid, 4-phenol sulphonic acid, 2,4-phenol disulphonic acid, pentachlorophenol, picric acid, o-chlorobenzoic acid, m-chlorobenzoic acid, p-chlorobenzoic acid, o-bromobenzoic acid, o-fluorobenzoic acid, 2,5-dichlorobenzoic acid, tribromobenzoic acid, 5-chloro-2-hydroxy benzoic acid, salicylic acid, 2,6-dihydroxybenzoic acid, o-nitrososalicylic acid, o-nitrobenzoic acid, 3,5-dinitrobenzoic acid, benzene sulphonic acid, p-toluene sulphonic acid, benzene-1,2,4,5-tetracarboxylic acid, m-sulphobenzoic acid, p-sulphobenzoic acid, benzoic acid (1)-disulphonic acid-(3,5),2-chlorobenzoic acid-(1)-sulphonic acid-(4),2-hydroxybenzoic acid-(1)-sulphonic acid-(5),5,5'-methylene disalicyclic acid, sulphanilic acid, o-sulphaminobenzoic acid, protocatechuic acid, α-resorcyclic acid, β-resorcyclic acid, hydroquinone-2,5-dicarboxylic acid, gallic acid, α-chlorocinnamic acid, phenyl sulphonyl acetic acid, phenyl thioglycolic acid, phenyl thionyl acetic acid, taurocholic acid, phenyl glyoxalic acid, 4-chloro-2-methyl phenoxyacetic acid, diphenyl ether disulphonic acid, N-phenyl amino methane sulphonic acid, 4,6-dichloroaniline-2-sulphonic acid, 1,3-phenylene diamine-4,6-disulphonic acid, benzaldehyde-2-sulphonic acid, benzaldehyde-4-sulphonic acid, benzaldehyde-2,4-disulphonic acid, diphenylamine sulphonic acid, 2-nitrodiphenyl amine sulphonic acid, phthalic acid, tetrachlorophthalic acid, 4-chlorophthalic acid, 3,6-dichlorophthalic acid, 3-nitrophthalic acid methyl ester, phthalimidoacetic acid, phthaluric acid, 4-sulphophthalic acid, isophthalic acid, 4-nitro isophthalic acid, 4-nitro isophthalic-1-methyl ester acid, 4-hydroxyisophthalic acid, 4,6-dihydroxy isophthalic acid, terephthalic acid, nitro terephthalic acid, oxyterephthalic acid, dichloroterephthalic acid, tetrachloroterephthalic acid, 2,5-dihydroxy-p-quinone, naphthalene-1-sulphonic acid, naphthalene-2-sulphonic acid, di-n-butyl naphthalene sulphonic acid, 2,6-naphthalene disulphonic acid, 1-naphthol sulphonic acid, 1-naphthol-2,4-disulphonic acid, 1-naphthol-2,5-disulphonic acid, 1-naphthol-3,6-disulphonic acid, 8-chloro-1-naphthol-3,6-disulphonic acid, 1,8-naphthsultone sulphonic acid, 1-naphthol-3,6,8-trisulphonic acid, 2-naphthol-6-sulphonic acid, 2-naphthol-1-sulphonic acid, 2-naphthol disulphonic acid, 2-naphthol trisulphonic acid, 1,7-dihydroxy - 3 - naphthalene sulphonic acid, 2,3-dihydroxy-6-naphthalene sulphonic acid, 1,8-dihydroxy-2,4-naphthalene disulphonic acid, chromotropic acid, naphthalene-1,4,5,8-tetracarboxylic acid, 4 - naphthalic acid phenyl sulphone, 5,6,7,8-tetrahydro - 2 - naphthol-3-carboxylic acid, 1-hydroxy-2-naphthoic acid, 2,8-dihydroxy-3-naphthoic acid, 2-hydroxy-3-naphthoic acid-6-sulphonic acid, N - acetyl-1-naphthylamine-3-sulphonic acid, naphthylamine disulphonic acid, naphthylamine trisulphonic acid, naphthsultam-1,8-sulphonic acid, oxytoluylic acid, o-tolylamido diacetic acid, β-naphthylamido diacetic acid, 4,4'-di-p-amino benzoyl amino diphenyl urea-3,3'-disulphonic acid, phenyl hydrazine-2,5-disulphonic acid, 2,3-dimethyl-4-amino azobenzene-4',5-disulphonic acid, 4'-aminostilbene-2,2'-disulphonic acid-(4 - azo-2-)naphthylamine-1-sulphonic acid-(4), 2-methylindol sulphonic acid, carbozole-2,7-disulphonic acid, 2-hydroxycarbazole-7-sulphonic acid, quinolinic acid, quinolin sulphonic acid, 2-(4'-amino phenyl) - benzthiazole - carboxylic acid-6-sulphonic acid, cinchomeronic acid, 2,4-pyridine dicarboxylic acid, barbituric acid, violuric acid.

In the preparation of the polyurethane polymer the polyhydroxyl compound is reacted with the organic polyisocyanate by techniques known in the polyurethane art. If desirable any of the chain extending agents mentioned above may be used in addition to the polyhydroxy compound and the organic polyisocyanate. The components are brought together in any sequence, and the quantity of polyisocyanate can be more or less than the equivalent quantity relatively to the reactive hydrogen atoms of the polyhydroxy compound being used and also possibly of the chain extender. Approximately equivalent quantities of polyisocyanate are advantageously employed so that a millable composition is obtained.

As already indicated, the reaction of the components can also take place in organic solvents of which benzene, chlorobenzene, acetone, methylethyl ketone and ethyl acetate are examples.

The subsequent formation of the salt takes place in a solvent at room temperature or at higher temperature, if desired under pressure. Polar solvents, such as alcohols, ketones and cyclic ethers, e.g., methanol, isopropanol, acetone, methylethyl ketone, dioxane and acetonitrile are particularly useful; solvents which are preferred are those which are miscible with water. The solution can contain water. The concentration of the solution depends solely on the solubility of the initial basic polyurethane composition and of the salt-like final product. Non-polar media such as benzene, toluene, and chlorobenzene are less advantageous since spontaneous cross-linking can take place in these media during the formation of the salts so that the entire composition gels. If the polyurethane composition has been fabricated in such a solvent, it is advisable that this solvent be at least partially replaced by one of the aforementioned polar solvents, or mixtures thereof.

It is also possible for the solvent to be mixed beforehand with water, but care must be exercised since the presence of water may restrict the solubility of the polyurethane composition. After the salt has been formed, the organic solvent can then be replaced partially or even completely by water. Of special interest are those solutions which contain 80 to 100% of water in the solvent.

Any polybasic acid is also suitable with the restriction that the maximum value of the $P_k$ need only be applicable to the first stage. Since most of the said dibasic and polybasic acids have a $P_k$ value in the second stage smaller than 4, they only react monofunctionally, and one or more of the acid functions are frequently already intermolecularly occupied. This is the case, for example, with amino disulphonic acids.

In principle, however, it is also possible to use dibasic and polybasic acids in which at least two acid groups having K-values higher than $10^{-4}$ are present. Examples of such acids are sulfuric acid, phosphoric acid, fluorosilicic acid, oxalic acid and disulphonic, trisulphonic and tetrasulphonic acids. When using such acids, the cross-linking effect is particularly strong, since a cross-linking caused by the difunctional nature of such acids is added to the cross-linking which is produced by salt formation according to this invention. The same applies with regard to compounds such as chloroacetic or bromoacetic acid which comprises a group capable of forming a salt and also a quaternizing group. In this case, the carboxyl group reacts immediately at room temperature in the solution, whereas the quaternization only occurs in the sense of a subsequent cross-linking with the final heating of the prepared elastomer film. Nevertheless, it is also possible in these cases to produce stable solutions if sufficient quantities (generally about 5 to 70%) of water are added.

The salt-forming acid or a mixture of the salt-forming acids can be introduced into the solution if desired while being dissolved in water or an organic solvent. Preferably, a dropwise addition of the acid should be made while the solution is being stirred. The acid may also be liberated in situ by using a mixture of a salt and a mineral acid, for example. The choice of acid to be used in any given case depends primarily on the basicity of the tertiary amine in the polyurethane. If strongly basic amides such as methyl diethanolamine are incorporated in the polyurethane, then acids with $P_k$ values up to 4 such as formic acid, for example, may be used. However, if the bound nitrogen is bonded to an aromatic radical, then trihaloacetic acids or sulphonic acids are preferred as well as the strong mineral acids.

The quantity of salt-forming acid to be used depends on the number of the tertiary nitrogen atoms of the polyurethane composition which is in solution. Although no advantage is obtained by using an excess of the acid, it is possible, and sometimes desirable, to use less than the total calculated quantity in order to vary the subsequent degree of cross-linking. It is especially advisable to so vary the degree of cross-linking when aqueous solutions are prepared, since they can be unstable at pH values of less than 4. On the other hand, it is also possible to utilize only one acid function of a polyfunctional acid for salt formation, so that the polymer which is formed contains free carboxyl or sulphonic acid groups. Such free groups influence the physical properties of the polymer such as the behavior with respect to solvents and the dyeing capacity and can also make subsequent cross-linking of the polymer possible, for example, by suitable treatment with basic agents. Similarly, polymers which still contain free basic nitrogen atoms may be subsequently cross-linked with polyfunctional quaternizing agents.

According to this invention, therefore, acids and mono-functional, bifunctional or oligofunctional quaternizing agents can be combined. It has also been found to be advantageous to use different salt-forming and quarternizing agents successively in different steps of the process. Therefore, the polyurethane composition is preferably reacted in solution with less than an equivalent quantity of an acid, specifically about 12 to 80% based on the number of tertiary amino groups present in the polyurethane mass, the solvent is substantially removed while shaping and the substantially or completely solvent-free polymer is subjected to an after-treatment with dibasic or polybasic acids or monofunctional or polyfunctional quaternizing agents.

Suitable monofunctional and polyfunctional quaternizing agents are for instance methyl iodide, dimethyl sulfate, methyl chloride, ethyl chloride, p-xylylene chloride, naphthylene-1,5-disulfonic acid chloride, chloracetic acid, ethylene chlorhydrin, bromo ethanol, dibromo butane, bromo acetic acid, chloromethyl phenyl isocyanate, chloromethyl benzoic acid ethyl ester, decamethylene bromide, decamethylene dibromide, chloromethyl isocyanate, bis-chloromethyl-biphenyl methane diisocyanate.

By pouring the solution onto suitable supports and removing the solvent while shaping, a flexible, elastic synthetic plastic is obtained which is substantially resistant to water but is soluble in certain circumstances in acetone. The solvent may be expediently removed at a high temperature, preferably at about 60° C. to about 150° C. with treatment of the foils, coatings and the like, after removing the solvent at high temperatures, for example, at about 80 to 140° C. affording an increase in the strength and chemical resistivity of the polyurethane. It has also been found expedient to distill off the solvent in vacuo. After the cross-linked product is formed in the organic solvent which may contain water, the organic solvent may be distilled off and replaced completely by water, in which case, the resulting solution can be poured on glass sheets, for example, to yield an elastic film.

In a preferred embodiment of this invention, the tertiary nitrogen atom is introduced into the polyurethane composition by means of the chain extender, wherein about 3 to 30% by weight, based on the total weight of the polyhydroxyl compound of methyl diethanolamine or butyl diethanolamine is used to prepare the polyurethane. The synthesized elastomer is then dissolved in acetone or alcohol with the addition of water, if desired, and converted into its corresponding salt with a monobasic acid such as hydrochloric acid, fluoroboric acid, phthalic acid and the sulfonic acids. If desired, small quantities of polybasic acids such as fluorosilicic acid, oxalic acid, disulfonic acids or bifunctional quaternizing agents such as p-xylylene dichloride may also be added. The organic solvent is then substantially or completely replaced by water. Substantially aqueous solutions of latex-like suspensions of the salt-like polyurethane composition are thus obtained from which a homogeneous solid elastomeric film is formed after evaporating the water.

The film thus produced may either be used directly or further treated as desired. If the acid used for forming the salt was employed in less than an equivalent quantity to the number of tertiary nitrogen groups, free tertiary nitrogen atoms are still present in which case the elastomer may be subsequently cross-linked with acids or quaternizing agents. In that process it is sufficient to immerse the films in solutions of the hereinbefore designated acids or quaternizing agents or to expose the films to the vapors of these agents. Bifunctional or polyfunctional acids or quaternizing agents such as oxalic acid, dyestuff sulfonic acids, fluorosilicic acid, dibromobutane and p-xylylene dichloride are especially advantageous for this purpose and such after-treatment of the elastomer leads to a considerable improvement in mechanical properties, particularly in the resistance to solvents.

In a modification of this invention, the polyurethane reaction product in solution may also be treated with inorganic or organic acids which have a $P_k$ value of from 4 to 6. Examples of some such suitable acids are formic acid, acetic acid, propionic acid, succinic acid, glutaric acid, adipic acid, acrylic acid, crotonic acid, methylethyl acetic acid, methacrylic acid, β-hydroxypropionic acid, α-naphthoic acid, benzoic acid, anilidoacetic acid, ascorbic acid, 2-hydroxycarbazole-3-carboxylic acid, m-hydroxyenoxic acid, pyridine carboxylic acids, pyrazolone carboxylic acids and uric acid. These compounds may be used either alone or in combination with the hereinbefore mentioned acids, and similarly, the reaction can take place in the presence of monofunctional or polyfunctional alkylation agents.

It is to be noted that the acids mentioned with respect to this modification of the invention may also be used in excess, especially if the acid chosen is volatile. The excess of the acid suppresses the hydrolysis of the poly-salt in aqueous solution and simultaneously acts to promote solution. However, this modification of the invention differs from the main invention because of the different behavior of the strong and weak acids. A sufficient number of salt groups are not obtained in this case so that the hydrogen bridges between the urethane groups do not form and the material has the appearance of an unvulcanized caoutchouc. After-treatment of the product is mandatory, as a consequence, and this may be easily accomplished according to the method herein outlined.

The products of the process are suitable as coatings and impregnations, and also as adhesion promoters and for elastic films, foils and filaments. The solutions of these polyurethanes can be used as plasticizers and anti-static agents or as auxiliaries in cloth printing and in the paper industry, and as protective colloids and dispersion agents when materials to be dispersed are added thereto in a quantity in excess of the dispersing agent. The processing thereof is again effected by removing the solvent while shaping. In this sense, the products of the process are. suitable as emulsifiers for polymerization reaction, as additives to plastic dispersions, as sizing agents, for impregnating leather and untreated skins, for sticking split leather, for preparing glass fibers and corded fabrics, as binders for dyestuff pigments and in the cosmetic industry as an additive to adhesive, and hair fixatives.

The invention is further illustrated but not limited by the following examples.

EXAMPLE 1

Production of the starting material

About 800 g. of polypropylene glycol (OH number 56) are dehydrated for about 20 minutes at about 130° C. and about 341 g. of 4,4′-diphenylmethane diisocyanate are incorporated therein by stirring. The temperature is kept for about 30 minutes at about 130° C. then cooled to about 40° C. and thereafter the mixture of about 200 g. of polypropylene glycol and about 100 g. of methyl diethanolamine is added all at once. With a considerable increase in viscosity, the temperature rises to about 80° C. The mixture is quickly poured into boxes and finally heated for about 24 hours at about 100° C. The result is a rollable polyurethane composition (Defo hardness 2650; Defo elasticity 30 at 20° C.).

To about 1440 g. of a 33.3% solution of the starting material in acetone are added in succession about 220 cc. of normal HCl and about 1200 cc. of water and the acetone is completely distilled off in vacuo from the clear solution. The opaque aqueous solution which is obtained has a $P_H$ value of about 5 and after being poured onto a glass sheet, leaves clear elastic films with the following properties:

Tensile strength _____kp./cm.² __ 188
Breaking elongation _____percent __ 850
Tension value at 100% elongation _____kp./cm.² __ 26
At 500% elongation _____kp./cm.² __ 102

EXAMPLE 2

The starting material is produced according to Example 1, using about 382 g. of 4,4'-diphenylmethane diisocyanate and about 120 g. of N-methyl diethanolamine. The polyurethane composition has a Defo hardness of 2900 and a Defo elasticity of about 27.

About 202 cc. of normal $H_2SO_4$ are added to about 500 g. of a 30% solution of this polyurethane composition in acetone at about 50° C. and the solution is poured onto glass sheets. A very elastic film is obtained which has the following mechanical values:

Tensile strength _____kp./cm.² __ 228
Breaking elongation _____percent __ 660
Tension value at 100% elongation _____kp./cm.² __ 50
At 500% elongation _____kp./cm.² __ 150

EXAMPLE 3

About 500 g. of the 30% solution in acetone, obtained as in Example 2 are mixed with about 70 cc. of normal $HNO_3$ and then with about 250 cc. of water and the acetone is distilled off in vacuo. An opaque ointment-like composition is left and this is diluted with water to a viscous solution.

The solution gives elastic films on glass sheets.

EXAMPLE 4

About 500 g. of the 30% solution in acetone, obtained according to Example 2, are mixed with about 100 ml. of half-normal oxalic acid solution. After pouring this solution onto glass sheets, highly elastic films with good tensile strength values are obtained.

EXAMPLE 5

About 500 g. of the 30% solution in acetone, obtained according to Example 2 are mixed with an aqueous solution of a fluorosilicic acid half neutralized beforehand with NaOH until a pH value of about 5 is reached. The opaque aqueous acetone solution obtained after drying on glass sheets yields soft films with a milky cloudiness and having a mat surface and a warm feel.

EXAMPLE 6

About a 20% solution of fluoroboric acid is added dropwise to about 500 g. of the 30% solution obtained according to Example 2, until a pH value of about 5 is reached and then about 300 cc. of water are added. After removing the acetone, the solution on glass sheets gives films having the following mechanical values:

Tensile strength _____kp./cm.² __ 199
Breaking elongation _____percent __ 762
Tension value at 100% elongation _____kp./cm.² __ 42
At 500% elongation _____kp./cm.² __ 117

EXAMPLE 7

About 500 g. of the 30% solution obtained according to Example 2 are brought to a pH value of about 5 with an aqueous solution of diglycolic acid, about 300 ml. of water are then added and the acetone is distilled off in vacuo.

The solution applied to glass sheets gives films with the following mechanical properties:

Tensile strength _____kp./cm.² __ 199
Breaking elongation _____percent __ 698
Tension value at 100% elongation _____kp./cm.² __ 34
At 500% elongation _____kp./cm.² __ 94

EXAMPLE 8

To about 100 g. of the 30% solution obtained according to Example 2 are added a methanolic solution of nitromalonic acid diethyl ester so that a sample of the solution mixed with water has a pH value of about 4.

The solution give a yellow elastic film on drying.

EXAMPLE 9

Production of the starting material

About 500 g. of polypropylene glycol (OH number 56) are dehydrated for about 20 minutes at about 130° C. and about 119 g. of 4,4'-diphenylmethane diisocyanate are incorporated by stirring. The temperature is kept for about 10 minutes at about 130° C. then lowered to about 70° C. and about 37.5 g. of finely powdered N,N'-dioxethyl piperazine are incorporated by stirring. The mixture is slowly heated, while continuing vigorous stirring until the reaction composition is viscous. It is then poured into boxes, finally heated for about 24 hours at about 100° C. and the rubber-like mass is drawn out on rollers to a soft sheet (Defo hardness 700; Defo elasticity 17).

To about 197 g. of a 33.3% solution of the starting material obtained in this way are added to solution about 3.1 parts of boric acid and about 9.1 g. of sorbitol in about 50 cc. of water and then another about 70 cc. of water. After distilling off the acetone in vacuo, an opaque viscous solution is obtained which gives on glass sheets, elastic, extremely adhesive hydrophilic forms. The strength is increased by subsequent heating of the foils at about 100° C.

EXAMPLE 10

To about 500 g. of the solution obtained according to Example 2, a solution of about 1.5 g. of 2',3-dimethyl-4-amino azobenzene disulphonic acid (4',5) in about 55 cc. of normal HCl is added dropwise. About 250 cc. of water are added to the yellow solution which is freed from acetone by distillation. Translucent orange yellow foils are obtained on glass sheets.

EXAMPLE 11

To about 500 g. of the 30% solution obtained according to Example 2 is added a solution of about 9 g. of chloroacetic acid in about 100 cc. of water. After adding another about 250 cc. of water, the acetone is completely distilled off. A thinly liquid, white, stable suspension is obtained which gives foils with the following mechanical properties when poured onto glass plates:

Tensile strength _____kp./cm.² __ 158
Breaking elongation _____percent __ 716
Tension value at 100% elongation _____kp./cm.² __ 30
At 500% _____kp./cm.² __ 110

After final heating for about two hours at about 100° C. the following values are obtained:

Tensile strength _____kp./cm.² __ 211
Breaking elongation _____percent __ 564
Tension value at 100% elongation _____kp./cm.² __ 53
At 500% elongation _____kp./cm.² __ 176

EXAMPLE 12

About 1000 g. of polypropylene glycol (OH number 56) is dehydrated for about 20 minutes at about 130° C. and reacted for about 1 hour at about 130° C. with about 353 g. of 2,4-toluylene diisocyanate. After cooling to about 40° C., about 180 g. of N-methyl-diethanolamine are incorporated by stirring. The melt quickly becomes highly viscous and is further heated in boxes for about 12 hours at about 100° C. The result is a rubber-like polyurethane composition with a Defo hardness of about 2500 and a Defo elasticity of about 30 at 20° C.

About 303 g. of a 33.3% solution of the polyurethane composition in acetone are mixed with about 6.5 g. of glacial acetic acid in about 750 ml. of water and the acetone is evaporated under water jet vacuum. The result is a viscous, opaque 12% solution.

A specimen of this solution is left standing at room temperature on a sheet of glass. After about 24 hours, it has formed a soft, slightly tacky film which is resistant to hot water and scarcely soften therein.

EXAMPLE 13

Following the procedure of Example 12, a polyurethane composition is produced using about 266 g. of 2,4-toluylene diisocyanate and about 120 g. of N-methyl diethanolamine. It has a Defo hardness of 1900, Defo elasticity 27 at 20° C.

About 414 g. of a 33.3% solution of the polyurethane composition in acetone are mixed with about 6 g. of propionic acid and about 300 ml. of water and the acetone is removed in vacuo. The result is a 36% viscous colloidal solution, which dries to form a clear, soft, tacky film.

EXAMPLE 14

The polyurethane compositon of Example 13 is dissolved using about 3 g. of glacial acetic acid (50% of the equivalent quantity) instead of about 6 g. of propionic acid, and a 40% stable, aqueous dispersion is obtained. A specimen of this solution is left to stand at room temperature on a sheet of glass. After about 24 hours, a soft, slightly tacky film has formed, which is resistant to hot water and is scarcely softened therein.

EXAMPLE 15

The polyurethane composition of Example 13 is dissolved by using about 14 g. of 50-acrylic acid instead of about 6 g. of propionic acid and an opaque 35% aqueous solution is obtained which dries out to form crystal-clear films.

EXAMPLE 16

The polyurethane composition of Example 13 is dissolved using about 12 g. of succinic acid instead of about 6 g. of propionic acid, and a 36% aqueous colloidal solution is obtained which has a pronounced Tyndall effect. The solution dries to form a non-tacky film which swells or softens in water.

EXAMPLE 17

The polyurethane composition of Example 13 is dissolved in about 13 g. of pyridine-4-carboxylic acid instead of about 6 g. of propionic acid and an opaque solution is obtained which dries to form a cloudy, tacky film.

EXAMPLE 18

1 kg. of an adipic acid-hexane diol-polyester (molecular weight 2000) are dehydrated at 130° in vacuo and then reacted for 30 minutes at 80° C. with 1088 g. of toluylene diisocyanate. Into the melt a solution of 400 g. of 1,4-butane diol and 120 g. of N-methyl diethanol amine in 1.6 l. of acetone is poured. While stirring and cooling, the solution begins to boil. After 2.5 hours at 55° C. the solution becomes highly viscous and is diluted with 2 l. of acetone and held for further three hours at 55° C. A clear 47.8 percent solution of the polyurethane in acetone is obtained which has a viscosity of more than 100 stokes.

400 g. of the solution are heated with 3.4 ml. of dimethyl sulphate for 30 minutes to 50° C. Thereafter 2.0 ml. of acetic acid and 300 ml. of water are added. After distillation of acetone a thinly liquid latex is obtained with a solid content of 44 percent. Poured onto glass plates the latex produces hard elastic, completely transparent films with a high lustre and a very good light stability.

EXAMPLE 19

250 g. of a polypropylene glycol ether (OH number 270) are dehydrated for 30 minutes at 120 to 130° C. and reacted at 50° C. with 388 g. of toluylene diisocyanate. The mixture is held for 90 minutes at 80° C. and has then added thereto at 30° C. with strong cooling a solution of 100 g. of diethylene glycol and 75 g. of N-methyl diethanol amine in 400 ccm. of acetone. The solution becomes more and more viscous and is diluted after one hour with further 500 ccm. of acetone. 225 g. of this solution have added thereto 5 ccm. of acetic acid and then very slowly a solution of 2.5 ccm. of phosphoric acid in 25 ccm. of water is added and the acetone is distilled off. A viscous somewhat opaque polyurethane solution is obtained which when brushed on a support dries to hard water-insoluble but swelling films.

EXAMPLE 20

250 g. of a phthalic acid-ethylene glycol-polyester are dehydrated for 30 minutes at 80° C. and reacted with 389 g. of toluylene diisocyanate. After cooling to 30° C. a solution of 125 g. of neopentyl glycol and 75 g. of N-methyl diethanol amine in 400 ccm. of acetone is added with strong cooling. After one hour further 665 ccm. of acetone are added. 200 g. of the viscous 50 percent polyurethane solution have added thereto 5 ccm. of acetic acid and then a solution of 1.3 ccm. of phosphoric acid in 50 ccm. of water. After addition of further 200 ccm. of water and 50 ccm. of ethylene glycol monomethyl ether acetate the acetone is distilled off in vacuo. The thick polyurethane latex thus obtained yields soft clear films after brushing onto a support. The film is heated for several hours at 100° C. and exhibits an extreme hardness.

EXAMPLE 21

1 kg. of polypropylene glycol (OH number 56) are dehydrated in vacuo for 30 minutes at 130° C. and reacted with 341 g. of 4,4'-diphenol methane diisocyanate. After cooling to 40° C. the melt has added thereto 135 g. of n-butyl diethanol amine while slowly stirring. The reaction mixture which is quickly becoming viscous is cast onto trays and heated for 24 hours at 100° C. A rubber-like polyurethane mass is obtained having a Defo-hardness of 2400 and a Defo-elasticity of 28 at 20° C. It can be worked to a smooth, clear transparent, honey colored sheet.

450 g. of a 33 percent solution of the polyurethane mass in acetone have added thereto 10 ccm. of water. Then the solution is heated with 20 ccm. of methyl chloride for four hours to 80° C. 300 ccm. of water are added and the acetone is distilled off in vacuo. A colloidal aqueous polyurethane solution is obtained which dries on a smooth support to a clear sem-elastic foil with the following mechanical properties:

Tensile strength _____kp./cm.$^2$__ 31
Tearing strength _____percent__ 1176
Load at 500 percent elongation _____kp./cm.$^2$__ 13

After watering this foil for 16 hours in a 5 percent oxalic acid solution the foil has the following properties:

Tensile strength _____kp./cm.$^2$__ 138
Tearing strength _____percent__ 715
Load at 500 percent elongation _____kp./cm.$^2$__ 76

EXAMPLE 22

500 g. of polypropylene glycol (OH number 56) are dehydrated in vacuo for 15 minutes at 130° C. and reacted with 266 g. of 2,4-toluylene diisocyanate. After cooling to 30° C. the liquid has added thereto 150 g. of N-methyl diethanol amine. Cooling shall prevent a too quick rising of temperature. When the mixture becomes homogenous and viscous, it is cast onto trays and heated for six hours at 80° C. A white rubber-like mass is obtained having a Defo-hardness of 2000 and a Defo-elastic-ity of 16.

340 g. of a 33 percent solution of the polyurethane mass in acetone have added thereto 9.5 g. of boric acid and 56 g. of sorbitol in 230 ccm. of water. After addition of further 280 ccm. of water the acetone is distilled off in vacuo. An aqueous colloidal polyurethane solution is obtained which dries to leather-like flexible films which are insoluble in 1 percent NaCl solution.

EXAMPLE 23

250 g. of an adipic acid - hexane diol - polyester (OH number 64) are dehydrated in vacuo at 130° C. and then reacted with 175 g. of toluylene diisocyanate for 30 minutes at 80° C. A solution of 50 g. of 1,4-butane diol and 30 g. of N-methyl diethanol amine in 300 ml. of acetone are added while stirring at 30° C. to the melt. The temperature rises to 56°. After two hours at 55° C. the solution is highly viscous and diluted with 400 ml. of acetone and held for three hours at 55° C. A clear 47.5 percent solution of the polyurethane in acetone is obtained having a viscosity of about 20 strokes at room temperature.

400 g. of this solution have added thereto 90 ccm. of 1 n-hydrochloric acid and 350 ccm. of water. Acetone is distilled off. A 32 percent latex results having a $P_H$ value of 6.5 which can be stored for several months. The latex gives on glass plates high-elastic transparent films with high light stability.

EXAMPLE 24

1 kg. of an adipic acid - ethylene glycol - polyester (molecular weight 620) are dehydrated at 60° C. and reacted with 1512 g. of toluylene diisocyanate. The temperature rises quickly. The mixture is held for 30 minutes at 80° C. and has then added thereto at 30° C. a solution of 620 g. of diethylene glycol and 120 g. of N-methyl diethanol amine in 2 l. of acetone. Cooling slowly down the exothermic reaction, the mixture is stirred for four hours at 50°. The viscous solution is then diluted with 2.8 l. of acetone and held for further two hours at 50° C. A 46 percent highly viscous polyurethane solution is obtained. 400 g. of this solution are heated with 1.1 ccm. dimethyl sulphate for 30 minutes to 50° C. and then reacted with 6 ccm. of lactic acid. After addition of 300 ccm. of water the acetone is distilled off in vacuo. A 38 percent aqueous polyurethane latex is obtained which when poured onto glass plates and dried at 70° gives a very hard clear polyurethane film.

Although the invention has been described in considerable detail in the foregoing discussion for the purpose of illustartion, it is to be understood that variations can be made by those skilled in the art without departing from the spirit of the invention and scope of the claims.

What is claimed is:
1. In a process for the production of predominantly linear polyurethanes from an organic compound containing active hydrogen containing groups as determined by the Zerewitinoff method and having a molecular weight of at least 400 and an organic diisocyanate in which at least one of these reactants contains at least one tertiary nitrogen atom, the improvement which comprises reacting the tertiary nitrogen atoms of the polyurethane in solution in a solvent with an acid having a $P_k$ value of less than 4 to convert the polyurethanes into their corresponding salts and evaporating the solvent to change the salt into a cured material.

2. The process of claim 1 wherein the polyurethane is produced from an organic compound containing active hydrogen containing groups as determined by the Zerewitinoff method and having a molecular weight of at least about 400, an organic diisocyanate and a chain extender having at least two active hydrogen atoms as determined by the Zerewitinoff method and a molecular weight of less than about 350.

3. The product of the process of claim 1.

4. The process of claim 1 in which the solvent is a polar hydrophilic solvent which is replaced by water.

5. The process of claim 2 in which the chain extender is methyl diethanolamine.

6. The process of claim 1 in which the organic compound containing active hydrogen containing groups is polypropylene ether glycol.

7. The process of claim 1 in which the diisocyanate is toluylene diisocyanate.

8. The process of claim 1 in which the diisocyanate is 4,4'-diphenylmethane diisocyanate.

9. The process of claim 1 in which the solvent is acetone.

10. The process of claim 1 in which the solvent is evaporated at a temperature of about 60° C. to about 150° C.

11. In a process for the production of predominantly linear polyurethanes from an organic compound containing active hydrogen containing groups as determined by the Zerewitinoff method and having a molecular weight of at least about 400 and an organic diisocyanate in which at least one of these reactants contains at least one tertiary nitrogen atom, the improvement which comprises reacting the tertiary nitrogen atoms of the polyurethane in solution in a solvent with an acid having a $P_k$ value of 4 to 6 to convert the polyurethanes into their corresponding salts, evaporating the solvent, and further curing by treating the product with a member selected from the group consisting of polybasic acids and monofunctional and polyfunctional quaternizing agents.

12. The process of claim 11 wherein the polyurethane is produced from an organic compound containing active hydrogen containing groups as determined by the Zerewitinoff method and having a molecular weight of at least about 400, an organic diisocyanate and a chain extender having at least two active hydrogen atoms as determined by the Zerewitinoff method and a molecular weight of less than about 35°.

13. The product of the process of claim 11.

14. An aqueous emulsifiable high molecular weight polyurethane polymer, said polymer being characterized by containing from about 0.42 to about 1.3 percent by weight of tertiary amino nitrogen, said tertiary amino nitrogen being substantially neutralized with a monocarboxylic acid containing 1 to 5 carbon atoms.

References Cited

UNITED STATES PATENTS

| 2,621,166 | 12/1952 | Schmidt et al. | 260—75 |
| 3,179,625 | 4/1965 | Ehrhart | 260—75 |
| 3,294,752 | 12/1966 | Wilkison | 260—77.5 |

FOREIGN PATENTS

| 1,006,151 | 9/1965 | Great Britain. |
| 1,379,133 | 10/1964 | France. |

MURRAY TILLMAN, Primary Examiner

JOHN C. BLEUTGE, Assistant Examiner

U.S. Cl. X.R.

117—124, 126, 142, 161; 260—29.2, 32.4, 32.8, 33.4, 37, 40, 47, 67, 75; 424—70